3,564,022
COLOR STABILIZED MALEIC ANHYDRIDE
AND PROCESSES THEREFOR
Gus P. Manoff, St. Louis, Mo., and Albert R. Hall, Caseyville, Ill., assignors to Monsanto Company, St. Louis, Mo., a corporation of Delaware
No Drawing. Filed Mar. 18, 1968, Ser. No. 714,025
Int. Cl. C07c 57/14
U.S. Cl. 260—346.8                                12 Claims

ABSTRACT OF THE DISCLOSURE

A process for stabilizing maleic anhydride by heating crude maleic anhydride in the presence of a heat stable acidic compound, followed by distillation and the subsequent addition of a hydrocarbon sulfide.

---

This invention relates to the stabilization of maleic anhydride.

Maleic anhydride can be produced by the vapor-phase oxidation of organic compounds such as for example, benzene, toluene, naphthalene, methyl naphthalene, phenol, cresol, benzophenone, furan, biphenyl, furfural, n-butene, 1-butene, 2-butene, butadiene, heptane, isooctane, crotonaldehyde and crotonic acid among others with a high ratio of air to the organic compound. By-products of the above reaction include other organic acids, chromogenic bodies, carbon dioxide and water. Crude maleic anhydride is generally exceedingly dark in color, and this is particularly true of maleic anhydride produced via the vapor-phase oxidation process. The colored and/or color forming byproducts and/or impurities are hereinafter referred to as chromogenic bodies. The crude maleic anhydride may be refined to a substantially color-free material, but it has been found that color reappears upon storage. Color is an undesirable characteristic of maleic anhydride and is an undesirable attribute in some materials, such as plastics, where color is an important feature of the material.

It is an object of this invention to provide a process for obtaining maleic anhydride which is substantially color-free and remains color-stable for extended periods of storage.

It is another object of this invention to provide a maleic anhydride composition which is substantially color-free and remains so for extended periods of storage.

In United States Pat. No. 3,115,477 maleic anhydride compositions having storage color stability are prepared by (1) treating crude maleic anhydride and from 0.1 to 10 percent of phosphorous pentoxide at a temperature of about 140° C. to 200° C., (2) distilling maleic anhydride therefrom, and (3) adding color stabilizing amounts of thiodipropionic acid or esters thereof to the distilled maleic anhydride.

It has been found that a highly acceptable maleic anhydride composition can be prepared by the step of: (1) treating a crude maleic nhydride at elevated temperatures with a small amount of a heat stable acidic compound, (2) distilling the resulting mass to recover maleic anhydride, and (3) adding to the treated and distilled maleic anhydride a small amount of a sulfide compound, hereinafter described as a "stabilizer," having the formula:

R'—S—R wherein R' is benzyl, phenyl, beta-phenyl-ethyl or alkyl of from 9 to 15 carbon atoms, R is benzyl, phenyl, beta phenyl-ethyl or alkyl of from 1 to 15 carbon atoms; provided that when R' is benzyl, R is benzyl, phenyl, beta phenyl-ethyl or alkyl having from 1 to 15 carbon atoms; when R' is phenyl, R is alkyl having from 1 to 15 carbon atoms; when R' is beta phenyl-ethyl, R is beta phenyl-ethyl; and when R' is alkyl having from 9 to 15 carbon atoms, R is alkyl having from 9 to 15 carbon atoms. The maleic anhydride composition produced by utilizing these three distinct steps as contrasted to a similar composition produced by the mere addition of a stabilizer to a distilled maleic anhydride is vastly superior, displaying excellent color stability over extended periods of time.

More specifically, the process of this invention comprises treating the crude maleic anhydride at a temperature of from about 130° C. up to but not exceeding the boiling point of the maleic anhydride with a small amount of a heat stable acidic compound or mixture thereof, such as, the inorganic acids such as ortho phosphoric, meta phosphoric, pyrophosphoric, phosphorus, the oxides of phosphorus and sulfur such as $P_2O_3$, $P_2O_4$, $P_2O_5$ and $SO_3$; the strong organic acids such as the alkane, aromatic, xylene and naphthalene sulfonic acids and the trichloro-, dichloro-acetic acids, oxalic acid, fumaric acid, the Lewis acids such as aluminum chloride, zinc chloride, stannic chloride and ferric chloride. The molten mass is thereafter distilled at a pressure of from about 100 to about 760 mm. Hg and a small amount of the stabilizer is added to the treated and distilled product yielding a maleic anhydride composition displaying the aforesaid storage color stability.

In the event tars are formed during the step of treating the crude maleic anhydride with a heat stable acidic compound, it may be necessary to prestrip the resultant mass to remove the tars so formed.

In the present invention, the amount of the heat stable acidic compound utilized is at least about 0.05% by weight based upon the total weight of the charged crude maleic anhydride. However, large quantities of a heat stable acidic compound can also be employed, the quantity of the acidic compound being limited solely by its effect on the economics of the refining process. In some instances, it will be found desirable to utilize up to about 2.0% for very dark crude maleic anhydride. However, generally the acid content will range from about 0.05 to about 1.5%.

Representative examples of the stabilizers of this invention are the alkyl benzyl sulfides such as methyl benzyl sulfide, propyl benzyl sulfide, butyl benzyl sulfide, heptyl benzyl sulfide, nonyl benzyl sulfide, dodecyl benzyl sulfide, tetradecyl benzyl sulfide and the various isomeric forms thereof; phenyl benzyl sulfide, dibenzyl sulfide, methyl phenyl sulfide, propyl phenyl sulfide, nonyl benzyl sulfide, bis(beta phenylethyl)sulfide and didodecyl sulfide. The preferred stabilizers are the benzyl sulfides, particularly dibenzyl sulfide. The amount of stabilizer utilized will generally range from about 5 to 500 p.p.m. and preferably from about 25 to about 75 p.p.m. by weight of the treated and distilled maleic anhydride.

The process of this invention will be described in greater detail in the specific examples which follow, wherein the term "parts" is employed to indicate parts by weight.

EXAMPLE I

Three hundred parts of a crude maleic anhydride has added thereto .6 part (0.2%) concentrated sulfuric acid by weight of the crude maleic anhydride and is charged to a suitable vessel. The vessel and contents are heated at atmospheric pressure and at a temperature of about 201° C. for about 1½ hours. The resulting mass is distilled at about 150 mm. Hg at 144° to 145° C. The recovered, treated and distilled maleic anhydride is clear and white to the eye.

To illustrate the improved storage color stability, heat stability tests are run for samples utilizing the present invention and for samples prepared in the same manner but without the addition of the present invention stabilizers.

Samples with and without the addition of dibenzyl sulfide (DBS) stabilizer which are fresh, that is, no storage, and which have been stored for 14 days at ambient conditions are heated to 140° C. and held there for six hours. The APHA number is noted at the beginning of the 6 hour 140° C. holding period and again at the end of the 6 hour holding period. The results are shown in Table I.

TABLE I

|  | No storage | | 14 days storage | |
| --- | --- | --- | --- | --- |
| P.p.m. DBS | 0 | 50 | 0 | 50 |
| Beginning | 10 | 10 | 125 | 15 |
| Final | 500 | 20 | 500 | 20 |

A control sample is prepared by heating crude maleic anhydride (no acid added) at atmospheric pressure for 1½ hours at a temperature of about 201° C. and subsequently distilling. Heat stability test results, on the recovered maleic anhydride, utilizing the above procedure, are shown in Table II.

TABLE II

|  | No storage | | 14 days storage | |
| --- | --- | --- | --- | --- |
| P.p.m. DBS | 0 | 50 | 0 | 50 |
| Beginning | 125 | 125 | 500 | 500 |
| Final | 250 | 250 | 500+ | 500+ |

It is thus noted that heating crude maleic anhydride with sulfuric acid prior to distillation improves the color but fails to minimize discoloration upon storage; likewise, the addition of dibenzyl sulfide to the distillate of a crude maleic anhydride which has not been heated with sulfuric acid does not display similar storage color stability. It is only the combination of the (1) treating a crude maleic anhydride at elevated temperatures with sulfuric acid (a heat stable acid) followed by, (2) the addition of dibenzyl sulfide to the treated and distilled maleic anhydride that produces a maleic anhydride composition having exceedingly high quality and storage color stability.

EXAMPLE II

The procedure of Example I was followed substituting phosphoric acid for sulfuric acid. The results are shown in Table III.

TABLE III

|  | No storage | | 14 days storage | |
| --- | --- | --- | --- | --- |
| P.p.m. DBS | 0 | 50 | 0 | 50 |
| Beginning | 10 | 15 | 20 | 15 |
| Final | 425 | 20 | 400 | 35 |

EXAMPLE III

The following replicate tests are conducted to show the color stabilizing effects of various sulfides of this invention: maleic anhydride is treated for about 3 hours at 165° C. and 280 mm. with about 0.2% (by weight of charged crude) of sulfuric acid. The resultant mass is distilled at 135° C. and 110 mm. and the maleic anhydride distillate is clear and white to the eye.

Replicate samples of the above distillate are prepared having added thereto 50 p.p.m. of the various sulfides. A control sample having no stabilizer added thereto is utilized for comparison purposes. Heat stability tests are performed following the procedure set forth in Example I with additional tests performed on samples stored 7 days. The results are shown in Table IV.

TABLE IV

| Sulfide | No storage | | 7 days storage | | 14 days storage | |
| --- | --- | --- | --- | --- | --- | --- |
|  | Beginning | Final | Beginning | Final | Beginning | Final |
| None (control) | 10 | 450 | 400 | 500+ | 450 | 500+ |
| Ethyl benzyl | 15 | 40 | 10 | 50 | 10 | 40 |
| Methyl benzyl | 15 | 25 | 15 | 60 | 10 | 90 |
| Phenyl benzyl | 20 | 160 | 175 | 300 | 100 | 250 |
| Dibenzyl | 10 | 30 | 10 | 30 | 15 | 35 |
| Methyl phenyl | 45 | 80 | 70 | 150 | 60 | 175 |
| Bis(beta phenylethyl) | 20 | 150 | 35 | 200 | 45 | 150 |
| Didodecyl | 40 | 100 | 40 | 100 | 60 | 110 |

To those skilled in the art, many obvious deviations from the precise manipulative steps set forth in the specific examples will be apparent, also the precise quantities of materials employed can be adjusted according to the sized limitations of the equipment employed. Hence, it is understood that the above description is given by way of illustration only and not of limitation and that deviations are possible within the spirit of the invention.

What is claimed is:

1. A process comprising the steps of (1) treating crude maleic anhydride at elevated temperatures having added thereto a small amount of a heat stable acidic compound, (2) separating the treated maleic anhydride by distillation and (3) adding to the treated and distilled maleic anhydride a small amount of a sulfide compound, having the formula:

R'—S—R wherein R' is benzyl, phenyl, beta-phenyl-ethyl or alkyl or from 9 to 15 carbon atoms, R is benzyl, phenyl, beta phenyl-ethyl or alkyl of from 1 to 15 carbon atoms; provided that, when R' is benzyl, R is benzyl, phenyl, beta phenyl-ethyl or alkyl of from 1 to 15 carbon atoms; when R' is phenyl, R is alkyl of from 1 to 15 carbon atoms; when R' is beta-phenyl-ethyl, R is beta phenyl-ethyl; and when R' is alkyl of from 9 to 15 carbon atoms, R is alkyl of from 9 to 15 carbon atoms.

2. A process according to claim 1 wherein there is added at least about .05% by weight of the crude maleic anhydride of said acidic compound.

3. A process according to claim 1 wherein there is added from about 5 to 500 p.p.m. by weight of treated and distilled maleic anhydride of said sulfide compound.

4. A process according to claim 1 wherein said acidic compound is sulfuric acid and said sulfide compound is dibenzyl sulfide.

5. A process according to claim 1 wherein said acidic compound is sulfuric acid or phosphoric acid.

6. A process according to claim 1 wherein said sulfide compound is a compound of the formula:

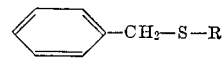

wherein R is benzyl, phenyl, beta phenyl-ethyl or alkyl or from 1 to 15 carbon atoms.

7. A process according to claim 6 wherein there is added from about 5 to 500 p.p.m. by weight of distilled maleic anhydride of said sulfide compound.

8. A process according to claim 1 wherein there is added at least 0.05% of sulfuric acid by weight of said crude maleic anhydride and about 25 to 75 p.p.m. of dibenzyl sulfide by weight of said treated and distilled maleic anhydride.

9. A composition comprising an elevated temperature heat stable acid treated and distilled maleic anhydride and from about 5 to 500 p.p.m., by weight of said treated and distilled maleic anhydride, of a sulfide compound having the formula:

R'—S—R wherein R' is benzyl, phenyl, beta phenyl-ethyl or alkyl of from 9 to 15 carbon atoms, R is benzyl, phenyl, beta phenyl-ethyl or alkyl of from 1 to 15 carbon atoms; provided that, when R' is benzyl, R is benzyl, phenyl, beta phenyl-ethyl or alkyl of from 1 to 15 carbon atoms; when R' is phenyl, R is alkyl of from 1 to 15 carbon atoms; when R' is beta phenyl-ethyl, R is beta phenyl-ethyl; and when R' is alkyl of from 9 to 15 carbon atoms, R is alkyl of from 9 to 15 carbon atoms.

10. A composition according to claim 9 wherein the heat stable acid for said treated maleic anhydride is sulfuric acid or phosphoric acid.

11. A composition according to claim 9 wherein said sulfide compound is a compound of the formula:

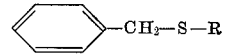

wherein R is benzyl, phenyl, beta phenyl-ethyl or alkyl of from 1 to 15 carbon atoms.

12. A composition according to claim 9 wherein said sulfide compound is dibenzyl sulfide and the heat stable acid for said treated maleic anhydride is sulfuric acid.

References Cited

UNITED STATES PATENTS 2,134,531   10/1938   Punnett  ——————— 260—346.8
3,115,477   12/1963   Bowman et al.  ———— 260—346.8

ALEX MAZEL, Primary Examiner

B. I. DENTZ, Assistant Examiner